United States Patent [19]

King, Jr. et al.

[11] Patent Number: 4,507,185
[45] Date of Patent: Mar. 26, 1985

[54] PHOTOGENERATION OF ACTIVE FORMATE DECOMPOSITION CATALYSTS FROM TRANSITION METAL COMPLEXES CONTAINING MANGANESE AND THE PRODUCTION OF HYDROGEN

[75] Inventors: Allen D. King, Jr.; R. Bruce King, both of Athens, Ga.; Donald E. Linn, Jr., Chicago, Ill.

[73] Assignee: University of Georgia Research Foundation, Inc., Athens, Ga.

[21] Appl. No.: 545,407

[22] Filed: Oct. 25, 1983

[51] Int. Cl.$^3$ .............................................. B01J 19/12
[52] U.S. Cl. ........................ 204/157.1 R; 204/158 R
[58] Field of Search .................. 204/157.1 W, 158 R; 423/648 R

[56] References Cited
U.S. PATENT DOCUMENTS 4,372,833  2/1983  King et al. ................. 204/157.1 W Primary Examiner—Howard S. Williams
Attorney, Agent, or Firm—Oblon, Fisher, Spivak, McClelland & Maier

[57] ABSTRACT

A process for producing hydrogen from formate and water by photogenerating an active formate decomposition catalyst from a transition metal complex having a formula $RMn(CO)_3$ is disclosed. The preferred catalysts are $CH_3C_5H_4Mn(CO)_3$ and $C_5H_5Mn(CO)_3$. This process overcomes the slower reaction rates when utilizing Group VIb hexacarbonyl compounds, $Cr(CO)_6$, $Mo(CO)_6$, or $W(CO)_6$ as active formate decomposition catalysts. Additionally, this process may be combined with a process for generating formate from carbon monoxide and hydroxide in a basic solution. The combined processes are the water gas shift reaction.

23 Claims, No Drawings

PHOTOGENERATION OF ACTIVE FORMATE DECOMPOSITION CATALYSTS FROM TRANSITION METAL COMPLEXES CONTAINING MANGANESE AND THE PRODUCTION OF HYDROGEN

BACKGROUND AND SUMMARY OF THE INVENTION

This invention relates to photogeneration of active formate decomposition catalysts containing manganese. More specifically, this invention is directed to producing hydrogen and carbon dioxide from formate salts and water by photogenerating an active formate decomposition catalyst. Additionally, the process may be expanded to generate formate salts from carbon monoxide and base. These two reactions when combined comprise the water-gas shift reaction.

Carbon monoxide is readily produced by the partial oxidation of a wide variety of carbon containing substances including coal, petroleum, and biomass. Carbon monoxide is not only a valuable feedstock for a variety of industrial synthesis processes but also can be combined with water to produce hydrogen which is another chemical feedstock of great value. This chemical reaction is known in the art as the water-gas shift reaction.

Current technology utilizes steam as a reactant in the water-gas shift reaction as shown in equation (1):

$$CO(g) + H_2O(g) \rightleftharpoons H_2(g) + CO_2(g) \quad (1)$$

This reaction is generally carried out in two stages with the first stage utilizing an iron oxide-chromium oxide catalyst operating at 315° C.–485° C. followed by a second stage which uses a zinc oxide-copper oxide catalyst system operating at lower temperatures, 175° C.–350° C. The incorporation of a second stage operating at a lower temperature is advantageous because the reaction is exothermic so that lower temperatures favor hydrogen formation.

In recent years considerable attention has been directed towards conducting the water-gas shift reaction under still milder conditions at temperatures between 100° C. and 200° C. with water present in a condensed state. This reaction is shown in equation (2):

$$CO(g) + H_2O(l) \rightleftharpoons H_2(g) + CO_2(g) \quad (2)$$

While highly favored from a free energy standpoint, this reaction unlike reaction (1) is mildly endothermic; thus, not only can a savings in energy be realized by operating at these lower temperatures, but in addition the mild endothermicity of equation (2) offers an advantage from an engineering standpoint in that any isothermal reactor using condensed water as a reactant will have reduced cooling demands in comparison to conventional systems. With the reactant water being present in a condensed state, homogeneous catalysts afford a convenient means for accelerating this reaction. Since the products, hydrogen and carbon dioxide, are gases, the separation of catalyst from product poses no problem. Finally, any commercial operation using condensed water and homogeneous catalysts under such mild conditions is likely to be inexpensive to construct, thus requiring low capital investment.

U.S. Pat. No. 4,372,833 discloses that Group VIb hexacarbonyl compounds, $Cr(CO)_6$, $Mo(CO)_6$, and $W(CO)_6$, when irradiated by light become active catalysts which greatly accelerate the chemical reaction whereby formate ion decomposes in the presence of water to form hydrogen and carbon dioxide according to equation (3):

$$HCO_2^- + H_2O(l) \rightleftharpoons H_2(g) + CO_2(g) + OH^- \quad (3)$$

Formate ion, on the other hand, is readily produced by a reaction between carbon monoxide and hydroxide ion according to reaction (4):

$$CO + OH^- \rightarrow HCO_2^- \quad (4)$$

The reactions of equations (3) and (4), when carried out together, constitute the water-gas shift reaction. See equation (2). The reaction of equation (4) proceeds very rapidly so that catalysis of the formate decomposition reaction can effect a marked acceleration of the overall water-gas shift reaction. See equation (2). In cases where the reaction proceeds in two steps, the reaction of equation (4) is followed by the reaction of equation (3).

A subsequent survey of transition-metal carbonyl compounds has shown that cyclopentadienylmanganesetricarbonyl and methylcyclopentadienylmanganesetricarbonyl when photolyzed are both capable of greatly accelerating the rate of decomposition of formate ion in the presence of water. The element manganese belongs to Group VIIB of the periodic table, and there is no reason to expect elements of this group to exhibit similar chemical properties to those of Group VIB: Cr, Mo, and W. Nevertheless, the rates of decomposition of formate ion induced by methylcyclopentadienylmanganesetricarbonyl are approximately double those achieved using $Cr(CO)_6$ under equivalent conditions. The reaction rates are thus significantly improved over rates for similar reactions known in the art. An exhaustive series of experiments have not been performed in order to delineate the mechanism by which this catalyst operates; therefore, no basis exists for comparing the mode of action of cyclopentadienylmanganesetricarbonyl and methylcyclopentadienylmanganesetricarbonyl with that disclosed previously in U.S. Pat. No. 4,372,833 for Group VIb hexacarbonyls. The total data available for these systems are listed in the following Examples and Tables I-VII of the Description of the Preferred Embodiments.

It is the object of the present invention to produce hydrogen from formate ion and water by photogenerating an active formate decomposition catalyst containing manganese. Additionally, the process may be expanded to generate formate ion from carbon monoxide and hydroxide ion, the sum of the two reactions being the water gas shift reaction. It is a further object to provide a novel catalytic process for producing hydrogen at relatively low temperatures and otherwise mild conditions wherein the cost of compounds cyclopentadienylmanganesetricarbonyl and methylcyclopentadienylmanganesetricarbonyl are very modest wherein compound methylcyclopentadienylmanganesetricarbonyl is readily available and wherein the reaction rates are significantly improved over rates for similar reactions known in the art.

These and other objects, aspects and advantages of this invention will become apparent from a consideration of the accompanying specification and claims.

DESCRIPTION OF THE PREFERRED EMBODIMENTS

The preferred embodiments of the present invention disclose a process for producing hydrogen from formate and water wherein an active formate decomposition catalyst is photogenerated from a transition metal complex having a formula $RMn(CO)_3$ wherein R is selected from the group consisting of an aromatic group and a substituted aromatic group using near ultraviolet light under oxygen free conditions at a temperature of 45° C. and above. The preferred aromatic group is a cyclopentadienyl group and the preferred substituted aromatic group is a cyclopentadienyl group substituted by an alkyl group.

In the preferred embodiments hydroxylic solvents or transparent water/oil microemulsions are used. Hydroxylic solvents are 2-ethoxy ethanol (Cellosolve), diethylene glycol monomethyl ether (Methyl Carbitol), propylene glycol monomethyl ether (UCAR Solvent LM), or triethylene glycol. Oxygen free conditions are maintained by gases such as argon, carbon monoxide, or nitrogen. Photo-assisted decomposition of formate occurs at a temperature of 45° C. and above. Near ultraviolet light sources include sunlight and artificial light sources such as a mercury vapor spotlight. The present invention discloses a process for producing hydrogen from formate and water which can be combined with a process for generating formate from carbon monoxide and hydroxide in a basic solution wherein the combined processes are known in the art as the water gas shift reaction. If the water gas shift reaction proceeds in two steps, the first step is the reaction of equation (4):

$$CO + OH^- \rightarrow HCO_2^- \qquad (4);$$

and the second step is the reaction of equation (3):

$$HCO_2^- + H_2O(l) \rightleftharpoons H_2(g) + CO_2(g) + OH^- \qquad (3)$$

EXAMPLE: I

Photo-Assisted Decomposition of Formate Ion Using $CH_3C_5H_4Mn(CO)_3$

In Example I a reaction mixture of 40 mL of 25% $H_2O$-75% Cellosolve V/V, 0.0202 g $CH_3C_5H_4Mn(CO)_3$, 0.5391 g $NaHCO_2$ at a temperature of 62±1° C., maintained under oxygen free conditions using an argon gas atmosphere (P 1 atm) was exposed to near ultraviolet light from a Westinghouse 100 W Mercury vapor spotlight. Hydrogen production is shown in Table I, below.

TABLE I

| Photo-Assisted Decomposition of Formate Ion Using $CH_3C_5H_4Mn(CO)_3$ | | |
|---|---|---|
| Status | Time (hr) | mL $H_2$ Produced |
| Dark | 0.00 | 0.00 |
| Dark | 0.10 | 0.00 |
| Light | 0.25 | 0.00 |
| Light | 0.37 | 0.13 |
| Light | 0.48 | 3.78 |
| Light | 0.75 | 17.5 |
| Light | 0.87 | 23.0 |
| Light | 1.07 | 31.7 |

EXAMPLE II

Photo-Assisted Decomposition of Formate Ion Using $CH_3C_5H_4Mn(CO)_3$

In Example II a reaction mixture 40 mL of 25% $H_2O$-75% Cellosolve V/V, 0.01665 g $CH_3C_5H_4Mn(CO)_3$, 0.5387 g $NaHCO_2$, at a temperature of 62±1° C., maintained under oxygen free conditions using a carbon monoxide atmosphere (P 1 atm) was exposed to near ultraviolet light from a Westinghouse 100 W mercury vapor spotlight. Hydrogen production is shown in Table II, below.

TABLE II

| Photo-Assisted Decomposition of Formate Ion Using $CH_3C_5H_4Mn(CO)_3$ | | |
|---|---|---|
| Status | Time (hr) | mL $H_2$ Produced |
| Dark | 0.00 | 0.01 |
| Light | 0.22 | 0.01 |
| Light | 0.40 | 1.41 |
| Light | 0.60 | 12.7 |
| Light | 0.85 | 23.7 |
| Light | 0.97 | 28.1 |
| Light | 1.12 | 34.0 |
| Light | 1.27 | 38.7 |
| Light | 1.40 | 41.1 |

EXAMPLE III

Photo-Assisted Decomposition of Formate Ion Using $CH_3C_5H_4Mn(CO)_3$

In Example III a reaction mixture of 40 mL of 25% $H_2O$-75% Cellosolve V/V, 0.01635 g $CH_3C_5H_4Mn(CO)_3$, 0.5436 g $NaHCO_2$, maintained at a temperature of 70±1° C., maintained under oxygen free conditions using a carbon monoxide atmosphere (P 1 atm), was exposed to near ultraviolet light from a Westinghouse 100 W mercury vapor spotlight. Hydrogen production is shown in Table III, below.

TABLE III

| Photo-Assisted Decomposition of Formate Ion Using $CH_3C_5H_4Mn(CO)_3$ | | |
|---|---|---|
| Status | Time (hr) | mL $H_2$ Produced |
| Dark | 0.00 | 0.00 |
| Dark | 0.21 | 0.00 |
| Light | 0.39 | 0.00 |
| Light | 0.58 | 5.28 |
| Light | 0.69 | 15.0 |
| Light | 0.79 | 23.3 |
| Light | 0.90 | 30.6 |
| Light | 1.01 | 37.0 |
| Light | 1.13 | 43.0 |

EXAMPLE IV

Photo-Assisted Decomposition of Formate Ion Using $CH_3C_5H_4Mn(CO)_3$

In Example IV a reaction mixture of 40 mL of 25% $H_2O$-75% Cellosolve V/V, 0.01315 g $CH_3C_5H_4Mn(CO)_3$, 0.5363 g $NaHCO_2$, at a temperature of 80±1° C., maintained under oxygen free conditions using a carbon monoxide atmosphere (P 1 atm), was exposed to near ultraviolet light from a Westinghouse 100 W mercury vapor spotlight. Hydrogen production is shown in Table IV, below.

TABLE IV

Photo-Assisted Decomposition of Formate Ion Using $CH_3C_5H_4Mn(CO)_3$

| Status | Time (hr) | mL $H_2$ Produced |
| --- | --- | --- |
| Dark | 0.00 | 0.02 |
| Light | 0.27 | 0.04 |
| Light | 0.41 | 4.20 |
| Light | 0.52 | 19.8 |
| Light | 0.62 | 33.1 |
| Light | 0.72 | 44.3 |
| Light | 0.84 | 53.2 |
| Light | 0.94 | 58.7 |

EXAMPLE V

Photo-Assisted Decomposition of Formate Ion Using $CH_3C_5H_4Mn(CO)_3$

In Example V a reaction mixture of 40 mL of 25% $H_2O$-75% Cellosolve V/V, 0.0100 g $CH_3C_5H_4Mn(CO)_3$, 0.5393 g $NaHCO_2$, at a temperature of $82 \pm 1°$ C., maintained under oxygen free conditions using a carbon monoxide atmosphere (P 1 atm), was exposed to near ultraviolet light from a Westinghouse 100 W mercury vapor spotlight. Hydrogen production is shown in Table V, below.

TABLE V

Photo-Assisted Decomposition of Formate Ion Using $CH_3C_5H_4Mn(CO)_3$

| Status | Time (hr) | mL $H_2$ Produced |
| --- | --- | --- |
| Dark | 0.00 | 0.01 |
| Dark | 0.17 | 0.02 |
| Dark | 0.31 | 0.03 |
| Light | 0.45 | — |
| Light | 0.57 | 2.09 |
| Light | 0.66 | 13.8 |
| Light | 0.75 | 25.7 |
| Light | 0.85 | 36.4 |
| Light | 0.95 | 46.0 |

EXAMPLE VI

Photo-Assisted Decomposition of Formate Ion Using $CH_3C_5H_4Mn(CO)_3$

In Example VI a reaction mixture of 40 mL of 25% $H_2O$-75% Cellosolve V/V, 0.0119 g $CH_3C_5H_4Mn(CO)_3$, 0.5446 g $NaHCO_2$, at a temperature of $85 \pm 1°$ C., maintained under oxygen free conditions using an argon atmosphere (P 1 atm), was exposed to near ultraviolet light from a Westinghouse 100 W mercury vapor spotlight. Hydrogen production is shown in Table III, below.

TABLE VI

Photo-Assisted Decomposition of Formate Ion Using $CH_3C_5H_4Mn(CO)_3$

| Status | Time (hr) | mL $H_2$ Produced |
| --- | --- | --- |
| Dark | 0.00 | 0.00 |
| Light | 0.12 | — |
| Light | 0.20 | 0.07 |
| Light | 0.27 | 6.20 |
| Light | 0.42 | 31.8 |
| Light | 0.47 | 38.3 |
| Light | 0.55 | 50.0 |

EXAMPLE VII

Photo-Assisted Decomposition of Formate Ion Using $C_5H_5Mn(CO)_3$

In Example VII a reaction mixture of 40 mL of 25% $H_2O$-75% Cellosolve V/V, 0.02280 g $C_5H_5Mn(CO)_3$, 0.5556 g $NaHCO_2$, at a temperature of $60 \pm 1°$ C., maintained under oxygen free conditions using a nitrogen atmosphere (P 1 atm), was exposed to near ultraviolet light from a Westinghouse 100 W mercury vapor spotlight. Hydrogen production is shown in Table VII, below.

TABLE III

Photo-Assisted Decomposition of Formate Ion Using $C_5H_5Mn(CO)_3$

| Status | Time (hr) | mL $H_2$ Produced |
| --- | --- | --- |
| Dark | 0.00 | 0.00 |
| Dark | 0.73 | 0.00 |
| Dark | 1.18 | 0.00 |
| Light | 1.23 | — |
| Light | 1.35 | 0.64 |
| Light | 1.52 | 3.04 |
| Light | 1.61 | 7.55 |
| Light | 1.87 | 11.6 |
| Light | 2.15 | 15.8 |
| Light | 2.48 | 19.8 |
| Light | 2.87 | 22.4 |

What is claimed is:

1. A process for producing hydrogen from formate and water wherein an active formate decomposition catalyst is photogenerated from a transition metal complex having a formula $RMn(CO)_3$ wherein R is selected from the group consisting of an aromatic group and a substituted aromatic group using near ultraviolet light under oxygen free conditions at a temperature of 45° C. and above in the presence of formate and water.

2. A process of claim 1 wherein the aromatic group is a cyclopentadienyl group and wherein the substituted aromatic group is a cyclopentadienyl group substituted by an alkyl group.

3. A process of claim 2 wherein the cyclopentadienyl group is $C_5H_5$— and wherein the cyclopentadienyl group substituted by an alkyl group is $CH_3C_5H_4$—.

4. A process of claim 3 wherein the near ultraviolet light is artificial light.

5. A process of claim 4 wherein the artificial light is a mercury vapor spotlight.

6. A process of claim 4 wherein the oxygen free conditions are maintained by a gas.

7. A process of claim 6 wherein the gas is selected from the group consisting of argon, carbon monoxide, and nitrogen.

8. A process according to claim 6 carried out with a solvent selected from the group consisting of hydroxylic solvents and transparent water/oil microemulsions.

9. A process according to claim 8 wherein the hydroxylic solvent is selected from the group consisting of 2-ethoxy ethanol, 2-(2-ethoxy ethoxy)ethanol, propylene glycol monomethyl ether, and triethylene glycol.

10. A process according to claim 8 wherein the solvent comprises 75% V/V of a reaction mixture.

11. A process according to claim 1 wherein formate is generated from carbon monoxide and hydroxide in a basic solution wherein the process is the water gas shift reaction.

12. A process of claim 11 wherein the water gas shift reaction comprises the following steps:
   (a) producing formate from carbon monoxide and water; and
   (b) decomposing formate in the presence of water to form hydrogen and carbon dioxide.

13. A process of claim 11 wherein the aromatic group is a cyclopentadienyl group and wherein the substituted aromatic group is a cyclopentaldienyl group substituted by an alkyl group.

14. A process of claim 13 wherein the cyclopentadienyl group is $C_5H_5$— and wherein the cyclopentadienyl group substituted by an alkyl group is $CH_3C_5H_4$—.

15. A process of claim 14 wherein the near ultraviolet light is artificial light.

16. A process of claim 15 wherein the artificial light is a mercury vapor spotlight.

17. A process of claim 15 wherein the oxygen free conditions are maintained by a gas.

18. A process of claim 17 wherein the gas is selected from the group consisting of argon, carbon monoxide, and nitrogen.

19. A process according to claim 17 carried out with a solvent selected from the group consisting of hydroxylic solvents and transparent water/oil microemulsions.

20. A process according to claim 19 wherein the hydroxylic solvent is selected from the group consisting of 2-ethoxy ethanol, 2-(2-ethoxy ethoxy)ehtanol, propylene glycol, monomethyl ether, and triethylene glycol.

21. A process according to claim 19 wherein the solvent comprises 75% V/V of a reaction mixture.

22. A process of claim 3 wherein the near ultraviolet light is sunlight.

23. A process of claim 14 wherein the near ultraviolet light is sunlight.

* * * * *